(No Model.)
C. G. LEVISON.
FLY BOOK.
No. 337,593. Patented Mar. 9, 1886.
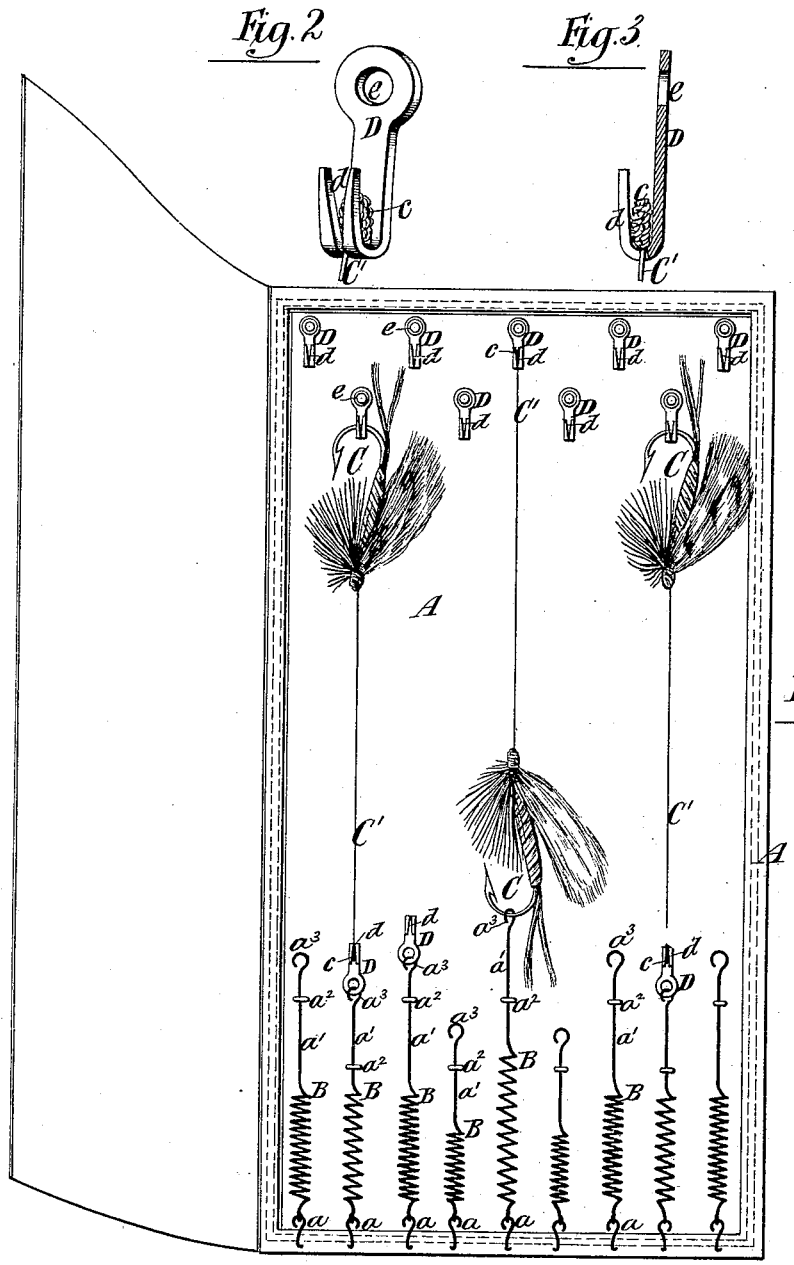
Witnesses:
Louis M. F. Whitehead.
Matthew Pollock
Inventor:
Chancellor G. Levison
by his Attys.
Brown & Hall

United States Patent Office.

CHANCELLOR G. LEVISON, OF BROOKLYN, NEW YORK, ASSIGNOR TO THOMAS B. MILLS, OF SAME PLACE.

FLY-BOOK.

SPECIFICATION forming part of Letters Patent No. 337,593, dated March 9, 1886.

Application filed June 18, 1884. Serial No. 135,247. (No model.)

*To all whom it may concern:*

Be it known that I, CHANCELLOR G. LEVISON, of the city of Brooklyn, in the county of Kings and State of New York, have invented a new and useful Improvement in Fly-Books, of which the following is a specification.

My invention relates to fly-books for holding what are known as "dropper-flies."

Dropper-flies are often provided with a knot, instead of a loop, at the end of the snell, and such knotted snells are preferable, as they are more easy of attachment to and detachment from the leader of the fishing-line, and enable a less conspicuous fastening to be made. The knotted snells are not, however, so much used as they otherwise would be, owing to the difficulty of holding the knotted snells extended in a fly-book; and the object of my invention is to provide a fly-book having provision for holding the knotted snells more securely than heretofore.

The invention consists in the combination, with the leaf of a fly-book, of two hooks, with one of which a fly-hook may be engaged, and the other of which is notched to receive and hold the knotted end of the snell, one of said hooks being attached to the leaf at one end thereof, and a spring-retainer with which the other hook is connected, and which is attached to the leaf at the other end, the spring-retainer serving to hold the snell under tension, or taut, with its knotted end in secure engagement with the notched hook. The notch in the hook being approximately V-shaped, the snell will draw into the bottom of the notch, through which the knot at the end of the snell cannot pass.

In the accompanying drawings, Figure 1 represents a fly-book embodying my invention. Figs. 2 and 3 are respectively a perspective view and a sectional view, both upon an enlarged scale, of a book having a single notch and a knotted snell secured therein; and Fig. 4 is a perspective view of a hook or hooked strip provided with numerous notches.

Similar letters of reference designate corresponding parts in all the figures.

A designates the leaf of the fly-book, at the lower end or bottom of which are a number of spring-retainers, B. As here shown, such retainer B consists of spirally-coiled wire, one end of which is attached at $a$ to the book, and the other end of which forms a straight prolongation, $a'$, fitting and received through a guide, $a^2$, and provided at the end with a hook, $a^3$.

C designates the fly-hooks, and C' the snells thereof, which at the ends opposite the hooks C are knotted, as shown at $c$.

In order to properly secure and retain the knotted snells C' $c$, I provide hooks D, which have in their beaks notches $d$. These notches are V-shaped, as shown most clearly in the enlarged views, Figs. 2 and 3, and when the knotted ends of the snells C' are engaged with them the snells draw down into the bottoms or points of the notches, and the knots $c$ cannot then draw through the notches.

The fly-hooks C may be engaged with the hooks $a^3$ of the spring-retainers B; or, if desired, a notched hook, D, may be secured on the hook $a^3$ of the retainer, and the fly-hook C may be held by a hook at the top of the book. Both arrangements are shown in the drawings. When the notched hook D is attached to the retainer, the hook with which the fly-hook C is engaged need not be a notched hook.

In lieu of employing separate hooks D, each provided with a single notch, $d$, and separately secured to the leaf by a rivet inserted through an eye, $e$, on the hook, I may employ a broad hook or hooked bar, D', in which are a number of notches, $d$, as shown in Fig. 4. This broad hook or hooked bar may be provided with holes $e'$, through which rivets may be inserted for securing it to the leaf of the book.

It will be observed that the spring-retainers adapt themselves readily to variations in the length of snells, and to remove a snell and hook from the book it is only necessary to slightly extend the spring-retainer in order to free the knotted end of the snell from the notched hook D.

I am aware that hangers for carriage-whips have been made in the form of a hook with a V-shaped notch for engagement with the knotted end of the whip-tip; but no retainer or securing device for the other end of the whip is necessary, because the weight of the butt of the whip is sufficient to hold it taut and straight.

I am also aware that violins have been provided with a tail-piece having slits or notches with which a knot at one end of a string may be engaged, the other end of the string being passed around a peg in the ordinary way, and the said string being tightened by turning the peg.

I do not claim either of the constructions or combinations above referred to as of my invention, nor could a combination like that employed in a violin be successfully used for a fly-book.

I make no claim to a notched hook, except in combination with a spring-retainer which will accommodate itself to snells of different length, and will always hold them taut by reason of the elasticity or resilience of the spring-retainer, and automatically.

What I claim as my invention, and desire to secure by Letters Patent, is—

The combination, with the leaf A of a fly-book, of two hooks, with one of which a fly-hook may be engaged, and the other of which, D, is provided with a V-shaped notch, $d$, to receive and hold the knotted end of a snell, one of said hooks being attached to the leaf at one end thereof, and a spring-retainer, B, with which the other hook is connected, and which is attached to the leaf at the other end, the spring-retainer serving to hold the snell under tension, with its knotted end in secure engagement with the notched hook, substantially as herein described.

CHANCELLOR G. LEVISON.

Witnesses:
FREDK. HAYNES,
EMIL SCHWARTZ.